US008224091B2

(12) United States Patent
Matsui

(10) Patent No.: US 8,224,091 B2
(45) Date of Patent: Jul. 17, 2012

(54) IMAGE PROCESSING APPARATUS, METHOD OF CONTROLLING THE SAME, AND PROGRAM FOR EXTRACTING INFORMATION USABLE FOR A SEARCH

(75) Inventor: Kenta Matsui, Inagi (JP)

(73) Assignee: Canon Kabushiki Kaisha, Tokyo (JP)

( * ) Notice: Subject to any disclaimer, the term of this patent is extended or adjusted under 35 U.S.C. 154(b) by 621 days.

(21) Appl. No.: 12/426,916

(22) Filed: Apr. 20, 2009

(65) Prior Publication Data

US 2009/0279780 A1 Nov. 12, 2009

(30) Foreign Application Priority Data

May 7, 2008 (JP) ................................ 2008-121646

(51) Int. Cl.
*G06K 9/34* (2006.01)
(52) U.S. Cl. ........ 382/173; 382/195; 382/262; 382/276; 358/1.15; 375/235; 380/268
(58) Field of Classification Search .................. 382/173, 382/195, 262, 276; 358/1.15; 375/235; 380/268
See application file for complete search history.

(56) References Cited

U.S. PATENT DOCUMENTS

| 2002/0101605 A1* | 8/2002 | Zeck ............................ 358/1.15 |
| 2003/0113017 A1 | 6/2003 | Thomas et al. |
| 2004/0223197 A1* | 11/2004 | Ohta et al. ..................... 358/538 |
| 2006/0221357 A1* | 10/2006 | Uzawa ............................ 358/1.1 |
| 2008/0180733 A1* | 7/2008 | Imamichi ..................... 358/1.15 |
| 2009/0244559 A1* | 10/2009 | Megawa et al. ................ 358/1.9 |

FOREIGN PATENT DOCUMENTS

| JP | 2004-215067 A | 7/2004 |
| JP | 2006331308 A | 12/2006 |

OTHER PUBLICATIONS

Office Action dated Jun. 1, 2012 in corresponding Japanese Application No. 2008-121646.

* cited by examiner

*Primary Examiner* — Chan S Park
*Assistant Examiner* — Eueng-Nan Yeh
(74) *Attorney, Agent, or Firm* — Fitzpatrick, Cella, Harper & Scinto

(57) ABSTRACT

Input image data is converted into vector data. The type of the input image data is determined. If it is determined that the input image data is of a first data type, information usable for a search is extracted from the input image data in processing of converting the input image data into the vector data, and information usable for a search is further extracted from the vector data later in the idle time of the image processing apparatus. If it is determined that the input image data is of a second data type, information usable for a search is extracted by performing region segmentation of the input image data. The extracted information is held in association with the vector data as additional information.

10 Claims, 13 Drawing Sheets

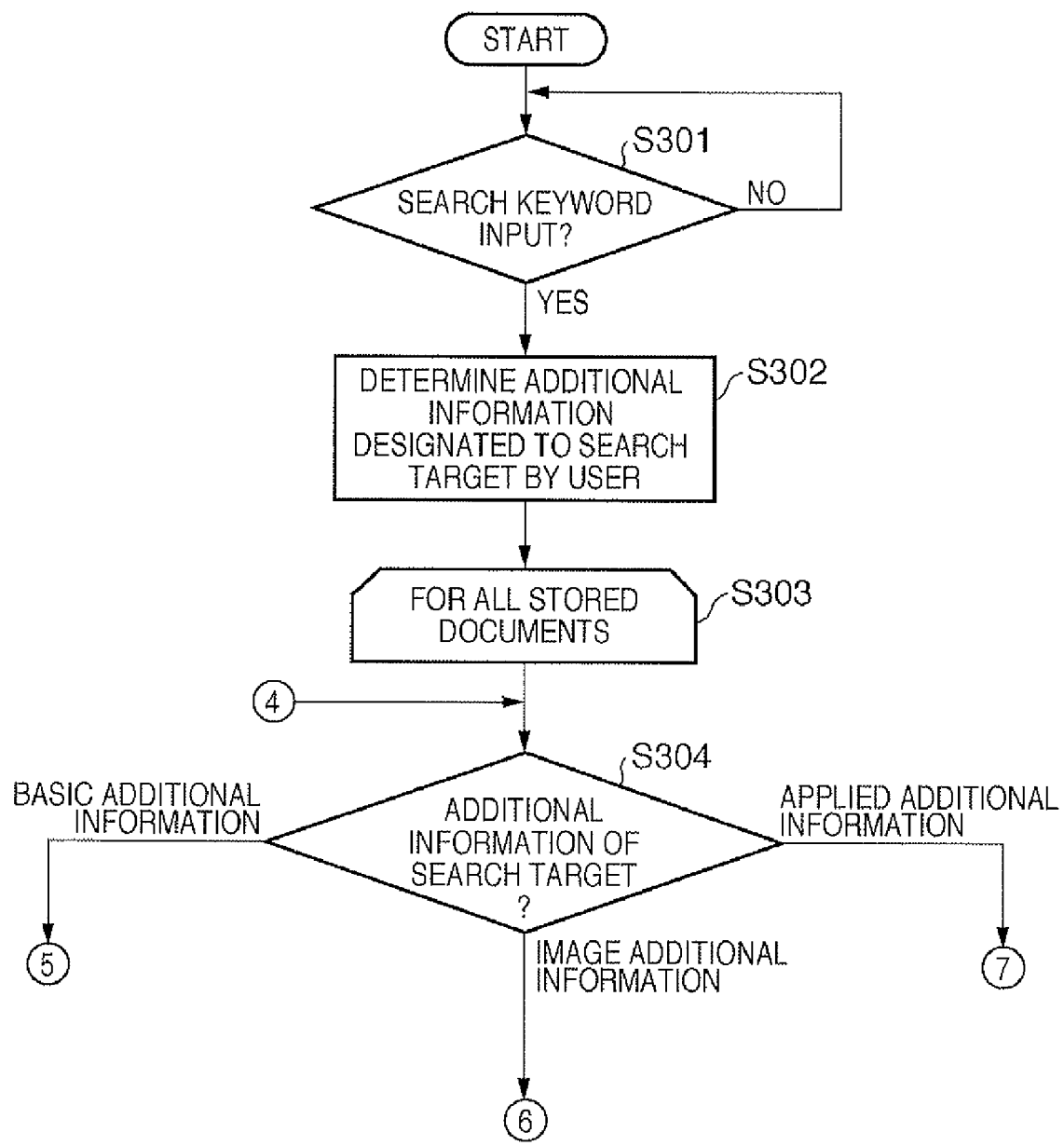

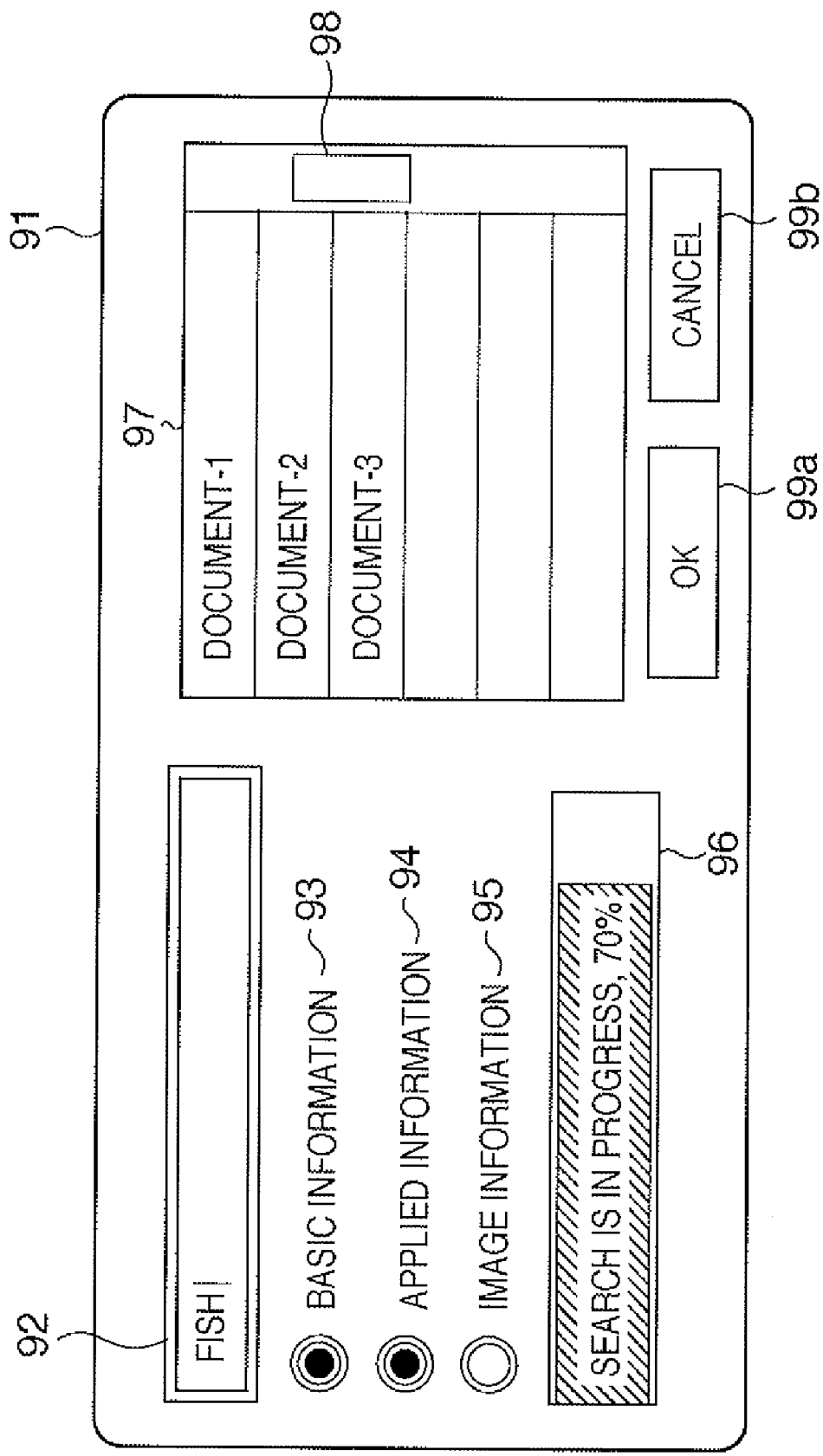

IMAGE PROCESSING APPARATUS, METHOD OF CONTROLLING THE SAME, AND PROGRAM FOR EXTRACTING INFORMATION USABLE FOR A SEARCH

BACKGROUND OF THE INVENTION

1. Field of the Invention

The present invention relates to an image processing apparatus for processing and storing input image data, a method of controlling the same, and a program.

2. Description of the Related Art

There is conventionally developed a technique of uniquely obtaining a target image from images input via a plurality of input units, such as PDL print images, scan images, and FAX received images, by searching (Japanese Patent Laid-Open No. 2004-215067).

However, the above-described prior art cannot search for information that is contained in a recent electronic document such as PDF (Portable Document Format) or XPS (XML Paper Specification) and is not actually printed. It is also impossible to search for an image except characters of scan data or information a user has added to a PDL image or a scan image.

SUMMARY OF THE INVENTION

The present invention has been made to solve the above-described problems, and provides an image processing apparatus capable of improving the search function and search efficiency, a method of controlling the same, and a program.

According to the first aspect of the present invention, an image processing apparatus for processing and holding input image data, comprises:

a conversion unit adapted to convert the input image data into vector data;

a determination unit adapted to determine a type of the input image data;

an extraction unit adapted to 1) if the determination unit has determined that the input image data is of a first data type, extract information usable for a search from the input image data in processing of converting the input image data into the vector data, and further extract information usable for a search from the vector data later in an idle time of the image processing apparatus, 2) if the determination unit has determined that the input image data is of a second data type, extract information usable for a search by performing region segmentation of the input image data; and a holding unit adapted to hold, as additional information, the information extracted by the extraction unit in association with the vector data.

According to the second aspect of the present invention, a method of controlling an image processing apparatus for processing and holding input image data, comprises steps of:

converting the input image data into vector data;

determining a type of the input image data;

1) if it is determined in the determining step that the input image data is of a first data type, extracting information usable for a search from the input image data in processing of converting the input image data into the vector data, and further extracting information usable for a search from the vector data later in an idle time of the image processing apparatus, 2) if it is determined in the determining step that the input image data is of a second data type, extracting information usable for a search by performing region segmentation of the input image data; and holding, as additional information, the information extracted in the extracting step in association with the vector data.

According to the third aspect of the present invention, a program stored in a computer-readable storage medium to cause a computer to control an image processing apparatus for processing and holding input image data, causes the computer to execute steps of:

converting the input image data into vector data;

determining a type of the input image data;

1) if it is determined in the determining step that the input image data is of a first data type, extracting information usable for a search from the input image data in processing of converting the input image data into the vector data, and further extracting information usable for a search from the vector data later in an idle time of the image processing apparatus, 2) if it is determined in the determining step that the input image data is of a second data type, extracting information usable for a search by performing region segmentation of the input image data; and holding, as additional information, the information extracted in the extracting step in association with the vector data.

Further features of the present invention will become apparent from the following description of exemplary embodiments with reference to the attached drawings.

BRIEF DESCRIPTION OF THE DRAWINGS

FIGS. 10A and 10B are flowcharts illustrating search processing according to the second embodiment of the present invention; and FIG. 11 is a view showing an example of a search operation panel according to the second embodiment of the present invention.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

The arrangement of a multi function peripheral (to be referred to as an MFP hereinafter) which functions as an image processing apparatus suitable to apply an embodiment of the present invention will be described with reference to FIG. 1.

Figure 1:
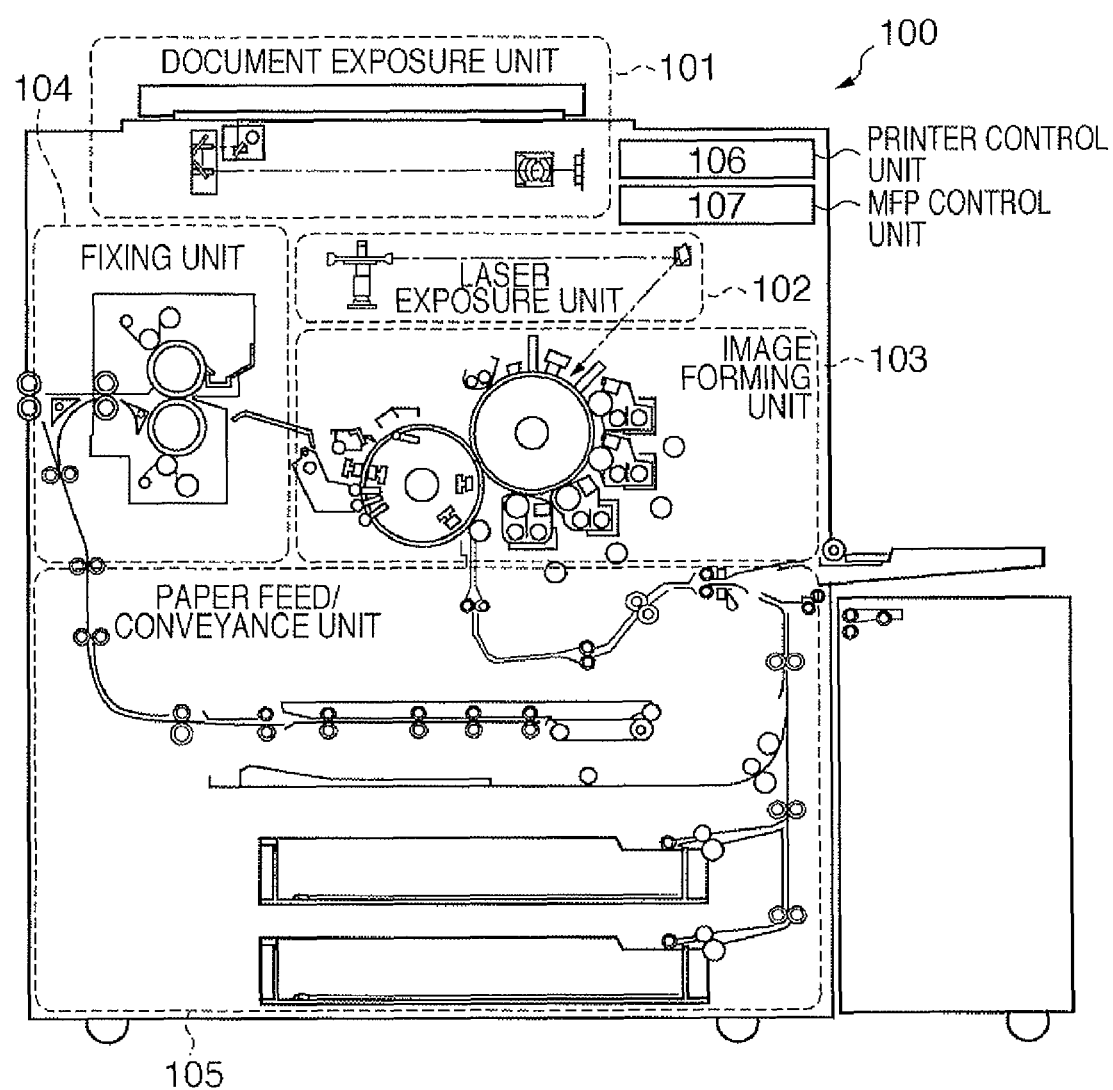
FIG. 1 is a view showing the arrangement of an image processing apparatus according to the first embodiment of the present invention.

FIG. 1 is a view showing the arrangement of the image processing apparatus according to the first embodiment of the present invention.

An MFP 100 mainly includes a document exposure (scanner) unit 101, a laser exposure unit 102, an image forming unit 103 having a photosensitive drum and the like, a fixing unit 104, a paper feed/conveyance unit 105, and a printer control unit 106 which controls these units.

The document exposure unit 101 optically reads a document image by illuminating a document placed on the document table, and converts the read image into an electrical signal, thereby creating image data. The laser exposure unit 102 inputs a light beam (e.g., laser beam) modulated based on the created image data to a polyhedral mirror (i.e., polygon mirror) which rotates at a uniform angular velocity, and irradiates the photosensitive drum with the reflected scan light.

The image forming unit 103 rotates the photosensitive drum, charges it by a charger, develops, using toners, a latent image formed on the photosensitive drum by the laser exposure unit 102, and transfers the toner image to a sheet (printing paper sheet). At this time, the image forming unit 103 forms an image by executing a series of electrophotographic processes of collecting toner powder that remains on the photosensitive drum without being transferred.

After that, the image forming unit 103 causes developing units (developing stations) having four color toners to repeatedly execute the electrophotographic processes in turn while a transfer drum with a sheet wound around it rotates four times. After the four revolutions, the sheet on which a full-color toner image of four colors (magenta (M), cyan (C), yellow (Y), and black (K)) is transferred is separated from the transfer drum and conveyed to the fixing unit 104.

The image forming unit 103 of the first embodiment has an arrangement for a color MFP capable of color printing. In a monochrome MFP for performing monochrome printing, only black (K) toner is used, and the electrophotographic processes are executed only once.

The fixing unit 104 incorporates a conveyance mechanism formed by combining rollers and belts, and a heat source (e.g., halogen heater). Using the conveyance mechanism and the heat source, the fixing unit 104 dissolves and fixes, by heat and pressure, the toners on the sheet with the toner image transferred by the image forming unit 103.

The paper feed/conveyance unit 105 includes one or more sheet storages represented by a sheet cassette or a paper deck. The paper feed/conveyance unit 105 separates one of a plurality of sheets stored in a sheet storage, and conveys it to the image forming unit 103 and the fixing unit 104 in accordance with an instruction from the printer control unit 106. The sheet is wound around the transfer drum of the image forming unit 103, and then conveyed to the fixing unit 104 after the drum has rotated four times. During the four revolutions, the YMCK toner images are transferred to the sheet. To form images on both sides of a sheet, the paper feed/conveyance unit 105 performs control so that the sheet which has passed through the fixing unit 104 passes through the conveyance path to the image forming unit 103 again.

The printer control unit 106 communicates with an MFP control unit 107 for controlling the entire MFP 100, and executes control in accordance with an instruction from it. Simultaneously, the printer control unit 106 manages the states of the document exposure unit 101, laser exposure unit 102, image forming unit 103, fixing unit 104, and paper feed/conveyance unit 105, and issues instructions to make them smoothly operate in cooperation with each other.

The detailed arrangement of a control unit (controller), that is, the MFP control unit 107 of the MFP 100 will be described next with reference to FIG. 2.

Figure 2:
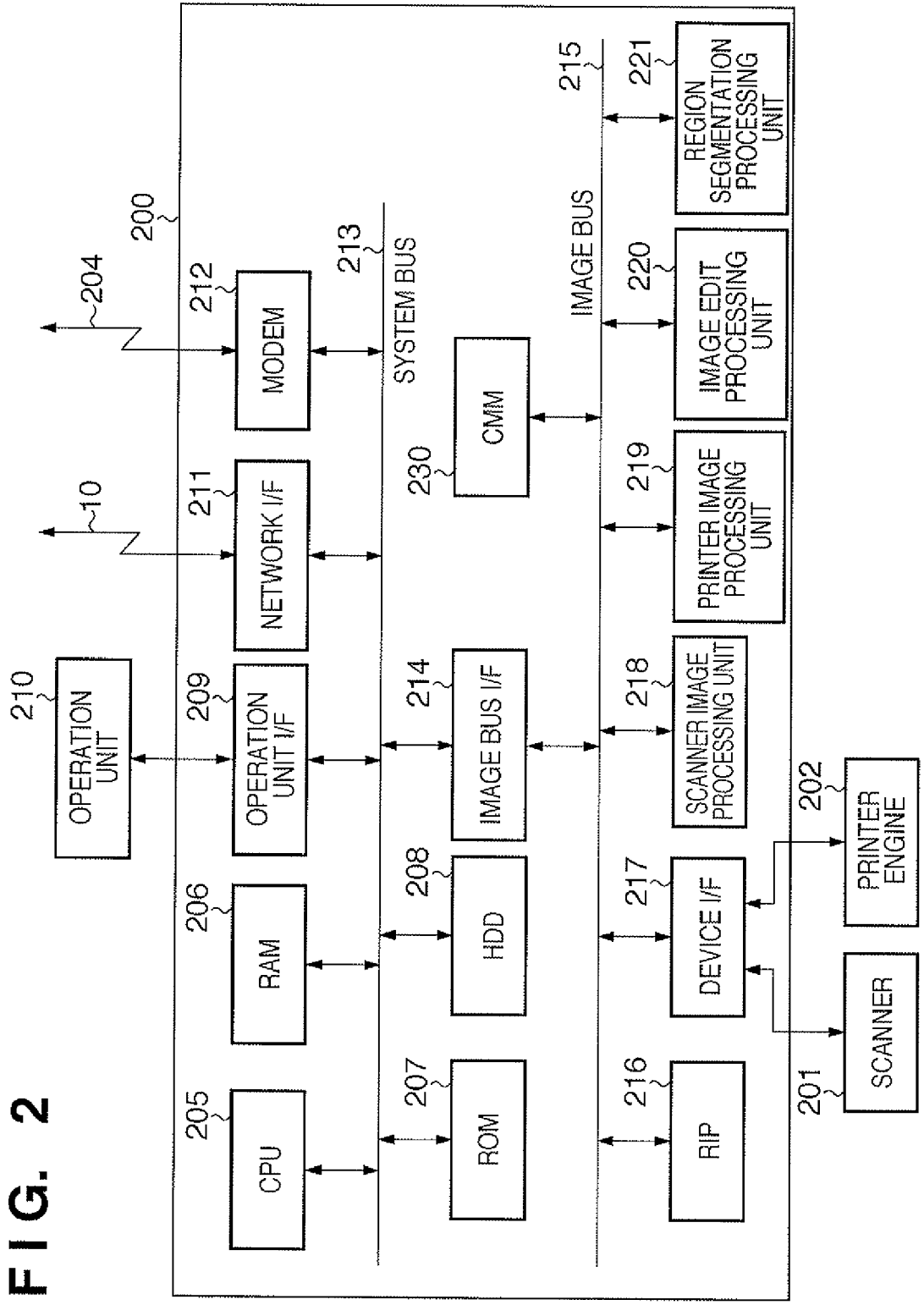
FIG. 2 is a block diagram showing an example of the arrangement of the controller of an MFP according to the first embodiment of the present invention.

FIG. 2 is a block diagram showing an example of the arrangement of the controller of the MFP according to the first embodiment of the present invention.

Referring to FIG. 2, a controller 200 is connected to a scanner 201 serving as an image input device and a printer engine 202 serving as an image output device to perform control for image data reading and print output. The controller 200 is also connected to a LAN 10 and a public line 204 to perform control to input or output image information and device information via the LAN 10.

A CPU 205 is a central processing unit for controlling the entire MFP 100. A RAM 206 serves as both a system work memory for the operation of the CPU 205 and an image memory for temporarily storing input image data. A ROM 207 is a boot ROM which stores the boot program of the system.

An HDD 208 is a hard disk drive which stores, for example, input image data and system software for various kinds of processing. An operation unit I/F 209 is an interface to an operation unit 210 having a display screen capable of displaying image data or the like, and outputs operation window data to the operation unit 210. The operation unit I/F 209 also transmits information input by the operator via the operation unit 210 to the CPU 205.

A network I/F 211 is implemented by, for example, a LAN card and connected to the LAN 10 to output/receive information to/from an external apparatus. A modem 212 is connected to the public line 204 to output/receive information to/from the external apparatus.

The above-described units are arranged on a system bus 213.

An image bus I/F 214 is an interface to connect the system bus 213 to an image bus 215 for transferring image data at a high speed. The image bus I/F 214 serves as a bus bridge for converting the data structure. A raster image processor (RIP) 216, a device I/F 217, a scanner image processing unit 218, a printer image processing unit 219, an image edit processing unit 220, a region segmentation processing unit 221, and a color management module (CMM) 230 are connected to the image bus 215.

The raster image processor 216 rasterizes vector data into bitmap data. The device I/F 217 connects the scanner 201 and the printer engine 202 to the controller 200, and performs image data conversion between a synchronous system and an asynchronous system.

The scanner image processing unit 218 executes various kinds of image processing such as correction, manipulation, and editing of image data input from the scanner 201. The printer image processing unit 219 executes various kinds of image processing such as correction and resolution conversion according to the printer engine 202 for image data to be printed. The image edit processing unit 220 executes various kinds of image processing such as image data rotation and image data compression/decompression processing.

The region segmentation processing unit 221 analyzes input bitmap data, segments it into regions each corresponding to an object cluster in the bitmap data, determines the attribute of each region, and classifies it. The attributes include "text", "image", and "graphic".

An example of region segmentation will be explained here with reference to FIG. 3.

Figure 3:
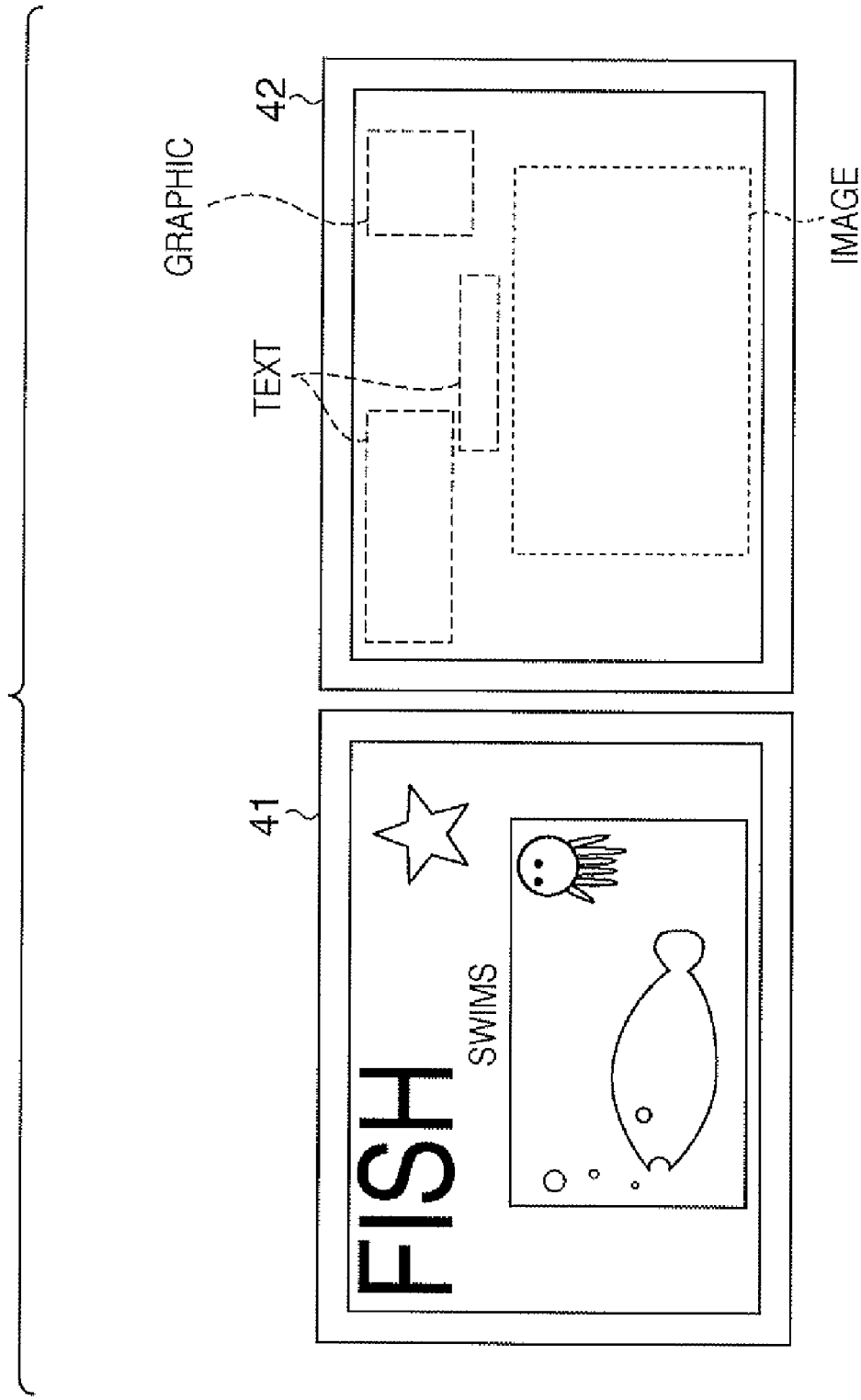
FIG. 3 is a view showing an example of region segmentation of an input image according to the first embodiment of the present invention.

FIG. 3 is a view showing an example of region segmentation of an input image according to the first embodiment of the present invention.

When region segmentation processing of an input image 41 is executed, for example, a region segmentation result 42 is obtained. Each portion indicated by a dotted line in the region segmentation result 42 represents one object unit obtained by image analysis. A character string added to each object represents an attribute ("text", "graphic", and "image" in this case).

Out of the regions classified based on the attributes, each text attribute region is subjected to character recognition processing using OCR and converted into a character string. That is, the character strings correspond to text images "FISH" and "swims." in the input image 41.

Out of the regions classified based on the attributes, the image attribute region is converted into image information by image information extraction processing. Image information is a character string representing a feature of an image. Examples are character strings "fish" and "sea". A general image processing technique such as image feature amount (e.g., the frequency or density of pixels included in an image) detection or face recognition is usable for image information extraction.

The CMM 230 is a dedicated hardware module which performs color conversion processing (also referred to as color space conversion processing) of image data based on a profile or calibration data. A profile is, for example, function information to convert color image data expressed by a device-dependent color space into a device-independent color space (e.g., Lab). Calibration data corrects a time-rate change in the color reproduction characteristic of the scanner 201 or the printer engine 202 in the MFP 100.

The configuration of controller software for controlling the operation of the MFP 100 will be described next with reference to FIG. 4.

Figure 4:
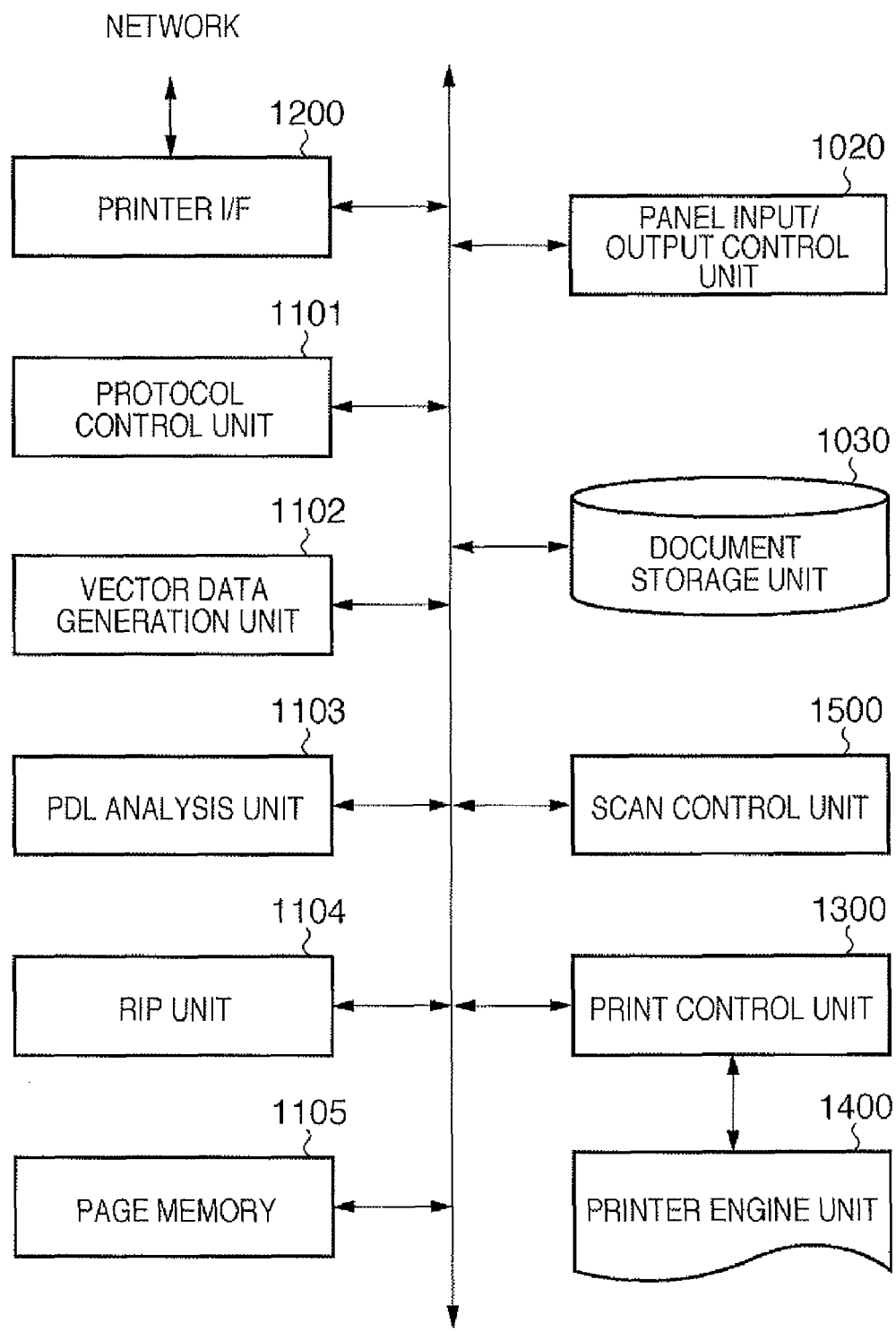
FIG. 4 is a block diagram showing the configuration of controller software for controlling the operation of the MFP according to the first embodiment of the present invention.

FIG. 4 is a block diagram showing the configuration of the controller software for controlling the operation of the MFP according to the first embodiment of the present invention.

A printer I/F 1200 outputs/receives data to/from an external apparatus. A protocol control unit 1101 analyzes and transmits a network protocol to communicate with an external apparatus. A vector data generation unit 1102 generates, from bitmap data, vector data that is a rendering description independent of the resolution.

A PDL analysis unit 1103 analyzes, for example, PDL (Page Description Language) data input via the printer I/F 1200, and converts it into vector data in a format (vector format) for easier processing. The vector data generated by the PDL analysis unit 1103 is transferred to a RIP unit 1104 functioning as a data rendering unit and processed. The RIP unit 1104 rasterizes the vector data into bitmap data. The rasterized bitmap data is successively rendered in a page memory 1105.

The page memory 1105 is a volatile memory which temporarily holds the bitmap data rasterized by the RIP unit 1104. A panel input/output control unit 1020 controls input/output from/to the operation unit 210.

A document storage unit 1030 is implemented by a secondary storage device such as a hard disk, and holds input document data as a data file that contains vector data of each job. When the data file of input document data is held, the user can extract and repeatedly output it at any time. This function of holding input data with a file format in the secondary storage device (document storage unit 1030) of an image output device for reuse is called a box function. The file system is called a box.

A scan control unit 1500 executes various kinds of processing such as correction, manipulation, and editing of image data (scan data) input from the scanner 201. A print control unit 1300 converts the contents of the page memory 1105 into a video signal, and transfers it to a printer engine unit 1400. The printer engine unit 1400 is a print mechanism unit to form, on a printing paper sheet, a permanent visible image based on the received video signal.

The structures of "PDL data" according to the first embodiment, the "print result" of the PDL data, "vector data" obtained by converting the PDL data into print data, and "additional information" associated with the vector data will be described next with reference to FIG. 5. Note that the additional information is used for a search, as will be explained in the second embodiment.

Figure 5:
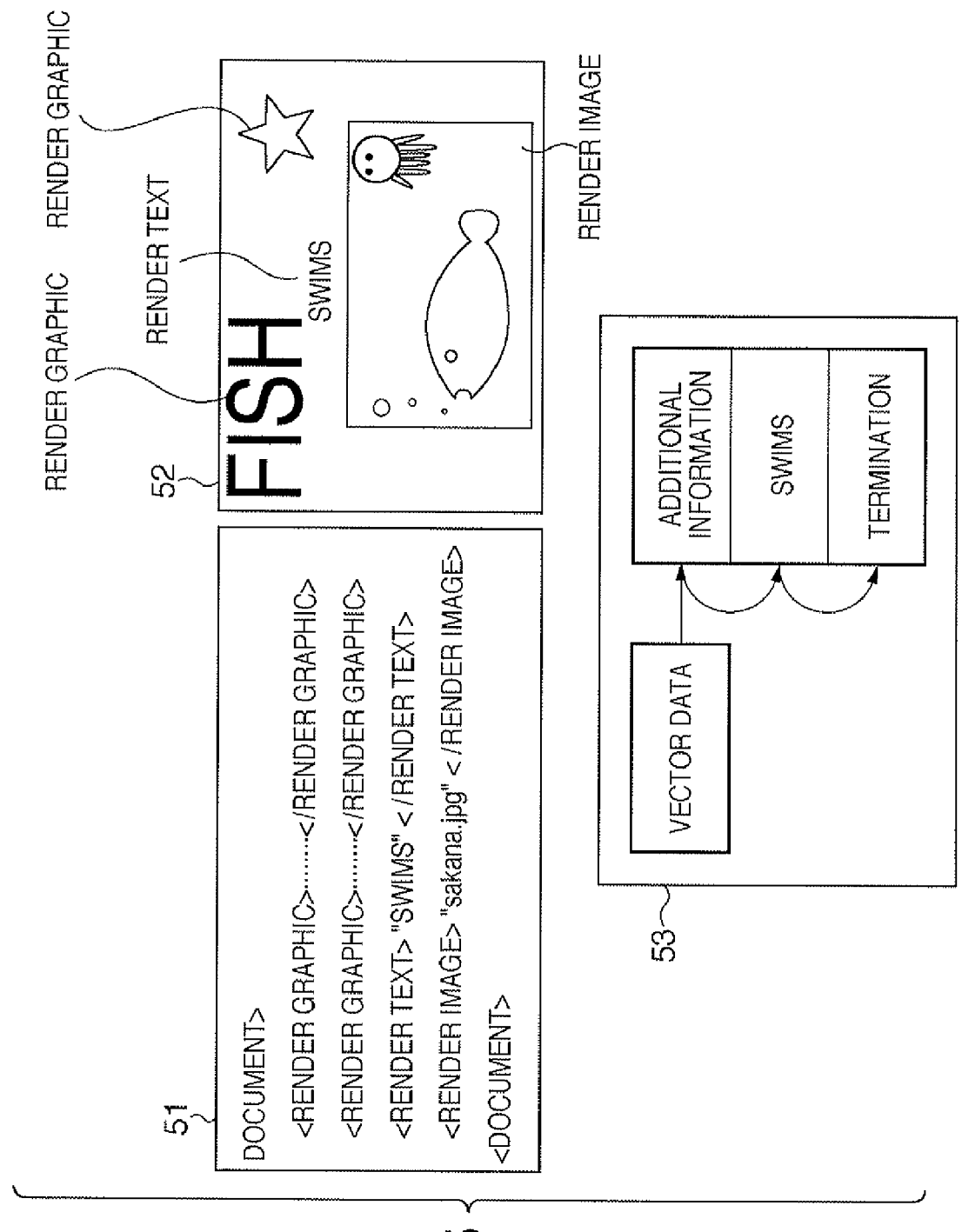
FIG. 5 is a view showing examples of the structures of vector data and additional information according to the first embodiment of the present invention, which are generated when input image data is PDL data.

FIG. 5 is a view showing examples of the structures of vector data and additional information according to the first embodiment of the present invention, which are generated when input image data is PDL data.

PDL data 51 is formed from a markup language that describes a text structure (e.g., caption or hyperlink) or modification information (e.g., font size or composition state) by enclosing part of a document in special character strings called "tags".

A document enclosed in <document> tags includes instructions to
  render "FISH" in first <render graphic>,
  render "☆" in next <render graphic>,
  render "swims." in <render text>, and
  render an "image of a fish" in last <render image>.

A rendering result 52 is obtained by interpreting the PDL data 51.

Stored data 53 is obtained by storing the vector data that is print data generated by interpreting the PDL data 51 in association with additional information obtained during interpretation of the PDL data 51. The stored data is the above-described data file.

A link is placed from the vector data to the additional information to associate them. A link is placed from the additional information to its entity. The link ends with information representing the termination of the additional information.

In this example, the character string "swims." extracted during interpretation of the PDL data 51 is stored in the stored data 53 (data file) as additional information.

The structures of "scan data" according to the first embodiment, "vector data" obtained by segmenting the scan data into regions and converting them into print data, and "additional information" associated with the vector data will be described next with reference to FIG. 6.

Figure 6:
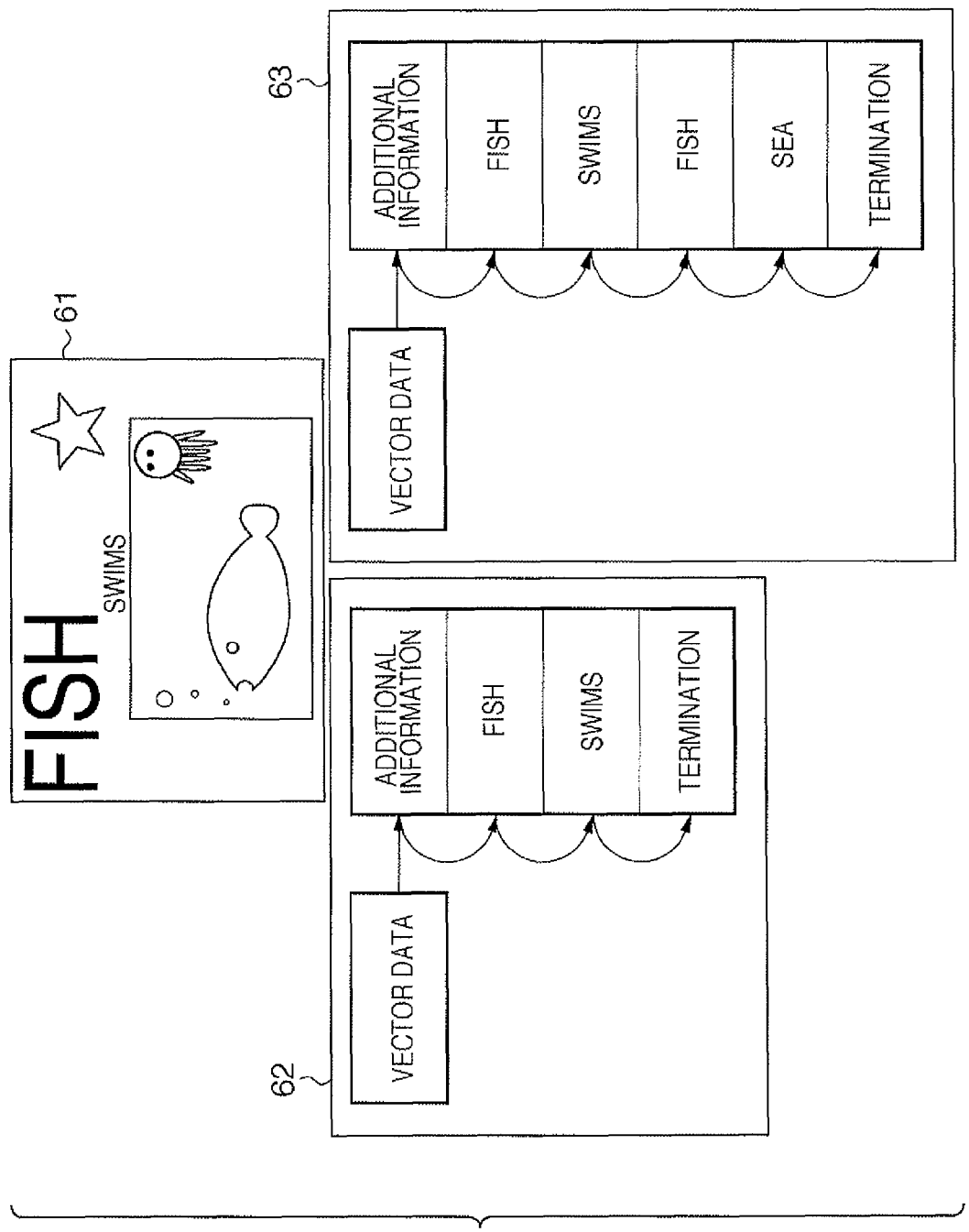
FIG. 6 is a view showing examples of the structures of vector data and additional information according to the first embodiment of the present invention, which are generated when input image data is scan data.

FIG. 6 is a view showing examples of the structures of vector data and additional information according to the first embodiment of the present invention, which are generated when input image data is scan data.

The region segmentation result 42 shown in FIG. 3 is obtained by segmenting scan data 61 into regions. When the character strings of the text attribute regions are extracted (character information extraction), association of vector data and additional information, like stored data 62, is formed. The stored data is the above-described data file. The link structure is the same as that of the stored data 53 (data file) in FIG. 5.

In the PDL data 51 shown in FIG. 5, the additional information in the stored data 53 (data file) is only "swims." In the scan data 61, however, "FISH" is also added to the additional information, besides "swims."

When the image information of the image attribute region is extracted (image information extraction), association of vector data and additional information, like stored data 63, is formed. The link structure is the same as that of the stored data 53 in FIG. 5 or the stored data 62 in FIG. 6.

As image information representing a feature of the image, "fish" and "sea" are added to the additional information in the stored data 63.

Processing to be executed by the controller 200 of the MFP 100 according to the first embodiment will be described next with reference to FIGS. 7A and 7B.

Figure 7A:
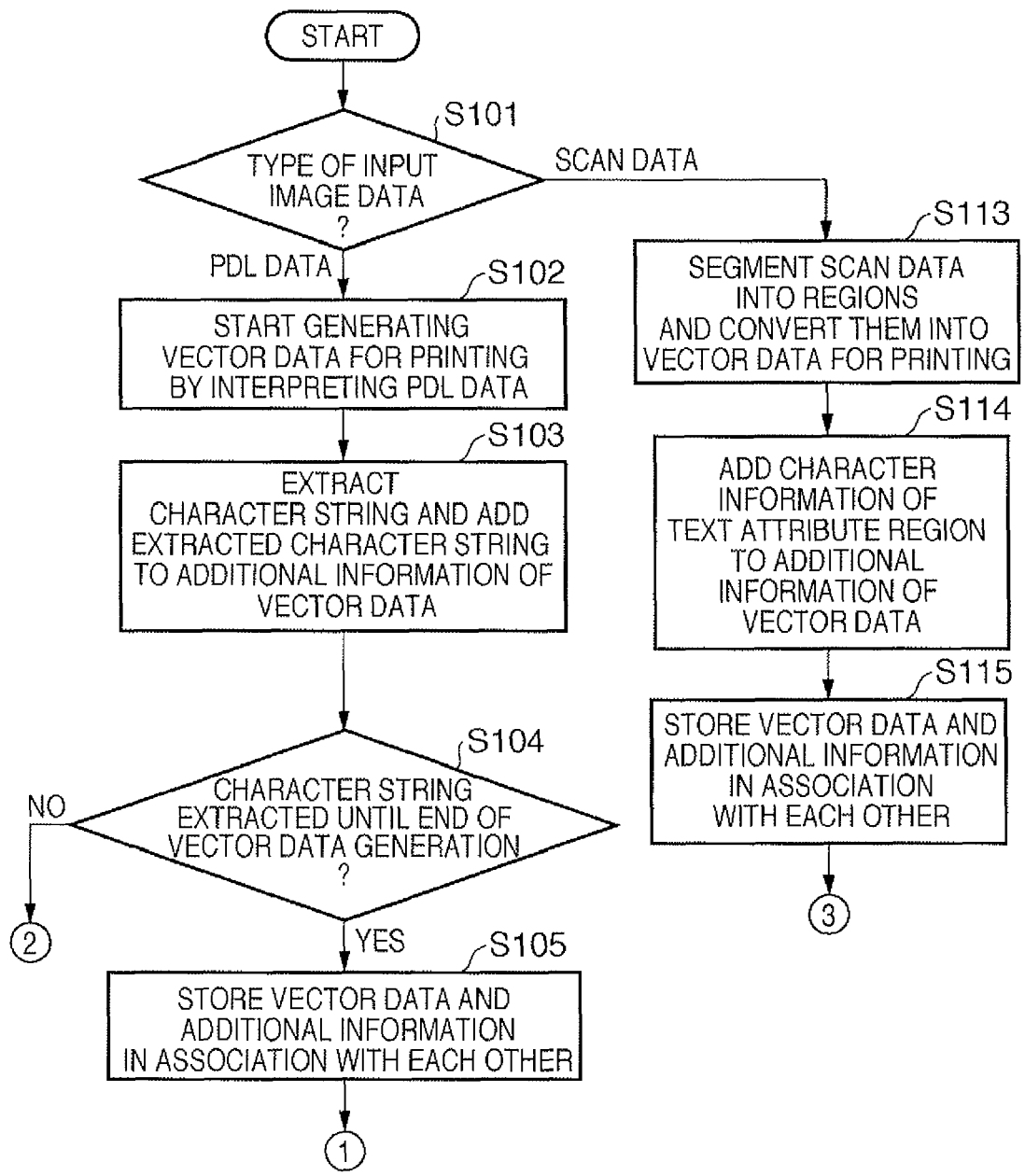
FIGS. 7A and 7B are flowcharts illustrating processing to be executed by the controller of the MFP according to the first embodiment of the present invention.
Figure 7B:
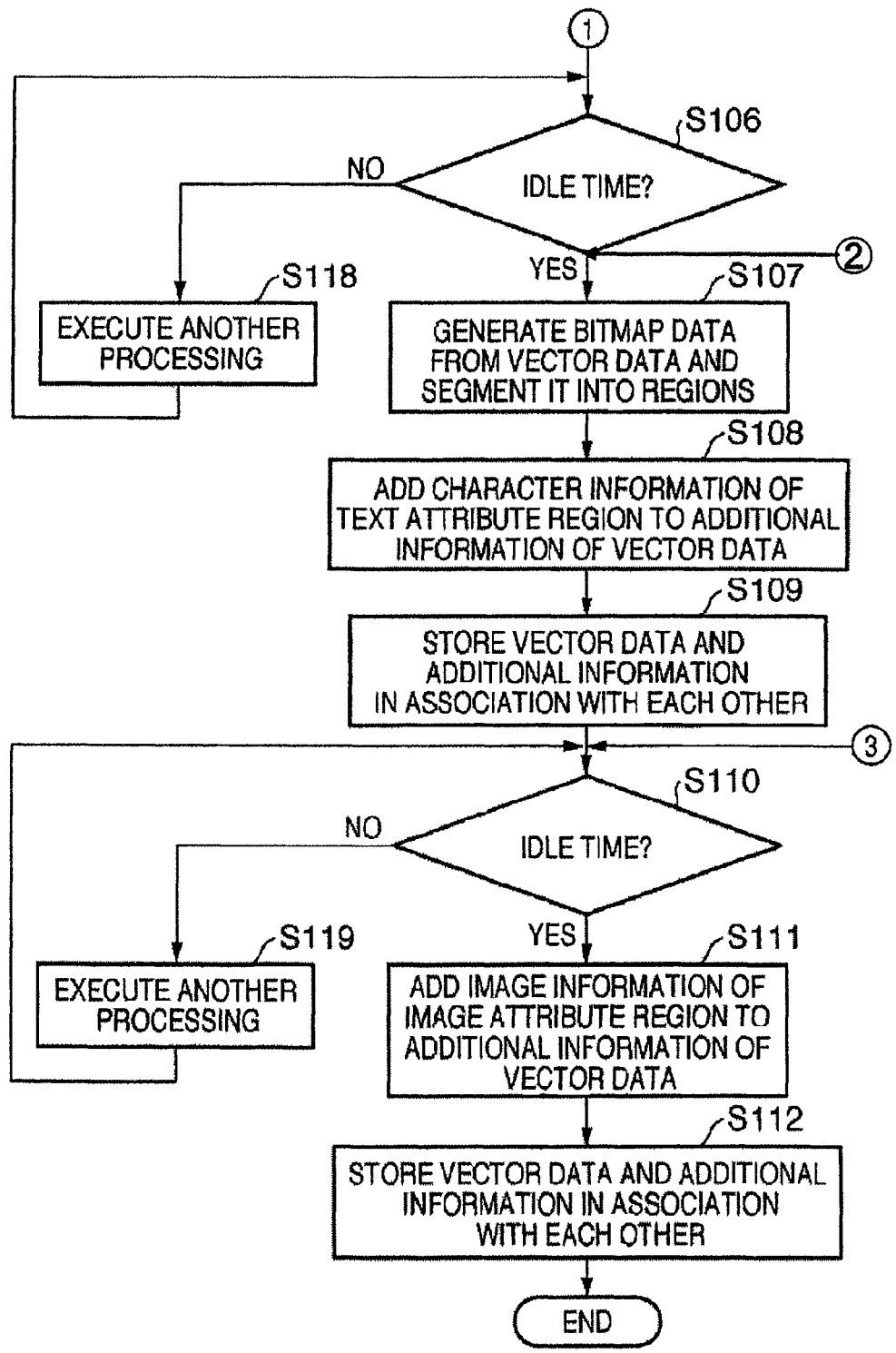

FIGS. 7A and 7B are flowcharts illustrating processing to be executed by the controller of the MFP according to the first embodiment of the present invention.

In step S101, the controller 200 determines the type of input image data. The controller 200 determines whether the input image data is PDL data or scan data. If the input image data is PDL data, the process advances to step S102. If the input image data is scan data, the process advances to step S113.

In step S102, the controller 200 interprets the PDL data to generate vector data for printing.

In step S103, the controller 200 extracts character strings contained in the PDL data while interpreting it, and adds the extracted character strings to the additional information of the vector data. As a result, a data file is created.

In step S104, the controller 200 determines whether character string extraction in step S103 has been done until the end of vector data generation (the process of converting PDL data into print data in a vector format). If character string extraction has been done (YES in step S104), the process advances to step S105. If character string extraction has not been done (NO in step S104), the process advances to step S107.

In step S105, the controller 200 associates the vector data with the additional information and stores them in a box allocated in the document storage unit 1030.

In step S106, the controller 200 determines whether it is an idle time in which nothing to process exists. If it is an idle time (YES in step S106), the process advances to step S107. If it is no idle time (NO in step S106), the process advances to step S118 to execute another processing.

In step S107, the controller 200 causes the RIP unit 1104 to generate bitmap data based on the stored vector data, and segments the generated bitmap data into regions.

In step S108, as a result of region segmentation, the controller 200 adds the character information of each text attribute region to the data file as the additional information of the vector data.

In step S109, the controller 200 stores the data file that associates the vector data with the additional information in the box allocated in the document storage unit 1030.

In step S110, the controller 200 determines whether it is an idle time in which nothing to process exists. If it is an idle time (YES in step S110), the process advances to step S111. If it is not an idle time (NO in step S110), the process advances to step S119 to execute another process.

In step S111, as a result of region segmentation, the controller 200 calculates the image feature amount of each image attribute region, and adds the image information to the data file as the additional information of the vector data.

In step S112, the controller 200 stores the data file that associates the vector data with the additional information in the box allocated in the document storage unit 1030.

If the input image data is scan data in step S101, the controller 200 segments the scan data that is bitmap data into regions to generate vector data for printing.

In step S114, as a result of region segmentation, the controller 200 adds the character information of each text attribute region to the additional information of the vector data. As a result, a data file is created.

In step S115, the controller 200 stores the data file that associates the vector data with the additional information in the box allocated in the document storage unit 1030.

As described above, according to the first embodiment, character information and image information are extracted from input image data, and stored and managed in the storage unit in association with an image (e.g., vector data) to be actually printed based on the input image data. It is therefore possible to refer to the storage unit and search, using the additional information, for not only a character or an image to be actually printed based on the input image data but also a character or an image in a scan image or information not to be actually printed. This implements efficient search processing. When input data is PDL data, a data file including vector data and additional information can be created stepwise. Consequently, first, additional information is quickly obtained in the process of converting PDL data into vector data, thereby creating a data file. Then, additional information is efficiently added using the idle time of the image processing apparatus.

Second Embodiment

In the first embodiment, extracted image information and character information are stored in one piece of additional information without distinction. However, the present invention is not limited to this. In the second embodiment, an arrangement will be described, which stores pieces of extracted information in additional information while distinguishing them.

The structures of "PDL data" according to the second embodiment, the "print result" of the PDL data, "vector data" obtained by converting the PDL data into print data, and "additional information" associated with the vector data will be described with reference to FIG. 8.

Figure 8:
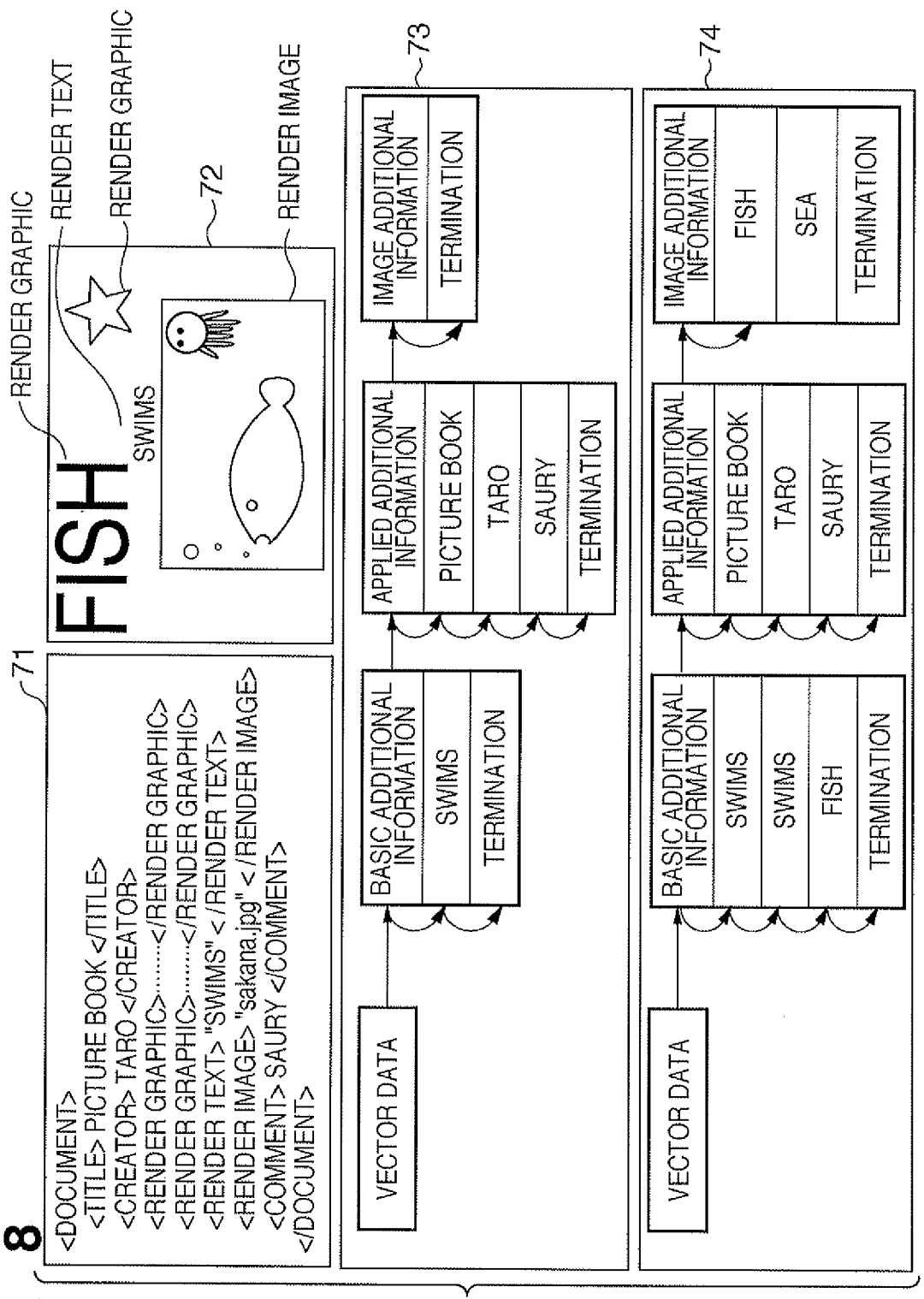
FIG. 8 is a view showing examples of the structures of vector data and additional information according to the second embodiment of the present invention, which are generated when input image data is PDL data.

FIG. 8 is a view showing examples of the structures of vector data and additional information according to the second embodiment of the present invention, which are generated when input image data is PDL data.

PDL data 71 is formed from a markup language, like the PDL data 51 in FIG. 5 of the first embodiment.

A document enclosed in <document> tags includes "picture book" of document <title> first, and then "Taro" of <creator>.

These pieces of information are not actually printed.

Then, the document includes instructions to
render "FISH" in <render graphic>,
render "☆" in next <render graphic>,
render "swims." in <render text>, and render an image (an image of fish) indicated by an image file name sakana.jpg in <render image>.

"Saury" is then included as <comment>. This is also information that is not actually printed, like "picture book" and "Taro".

A rendering result 72 is obtained by interpreting the PDL data 71. As is apparent from the rendering result 72, the character strings "picture book", "Taro", and "saury" as <comment> texts in the PDL data 71 are not rendered.

Stored data 73 is obtained by storing the vector data that is print data generated by interpreting the PDL data 71 in association with additional information obtained during interpretation of the PDL data 71.

A link is placed from the vector data to the additional information to associate them. The additional information includes "basic additional information", "applied additional information", and "image additional information" and has links that are sequentially placed from the vector data. A link to the entity of each additional information is also placed. The link ends with information representing the termination of each additional information.

In this example, the character string "swims." which is extracted during interpretation of the PDL data 71 and is to be actually printed is stored in the stored data 73 as basic additional information.

The character string "picture book", "Taro", and "saury" which are extracted during interpretation of the PDL data 71 but are not to be actually printed are stored in the stored data 73 as applied additional information.

Stored data 74 includes vector data and additional information which are generated by rasterizing the vector data of the stored data 73 into bitmap data, segmenting the rasterized bitmap data into regions, and extracting character information and image information.

"Swims." and "FISH" are extracted as character information, like the stored data 63 in FIG. 6. These pieces of information are stored in the basic additional information as information to be actually printed. As image information, "fish" and "sea" are extracted and stored in the image additional information.

This structure allows easily meeting the user's requirement to, for example, "search for only printed information" or "exclude images from search targets". Hence, the performance and convenience of a search can be expected to improve.

Figure 9:
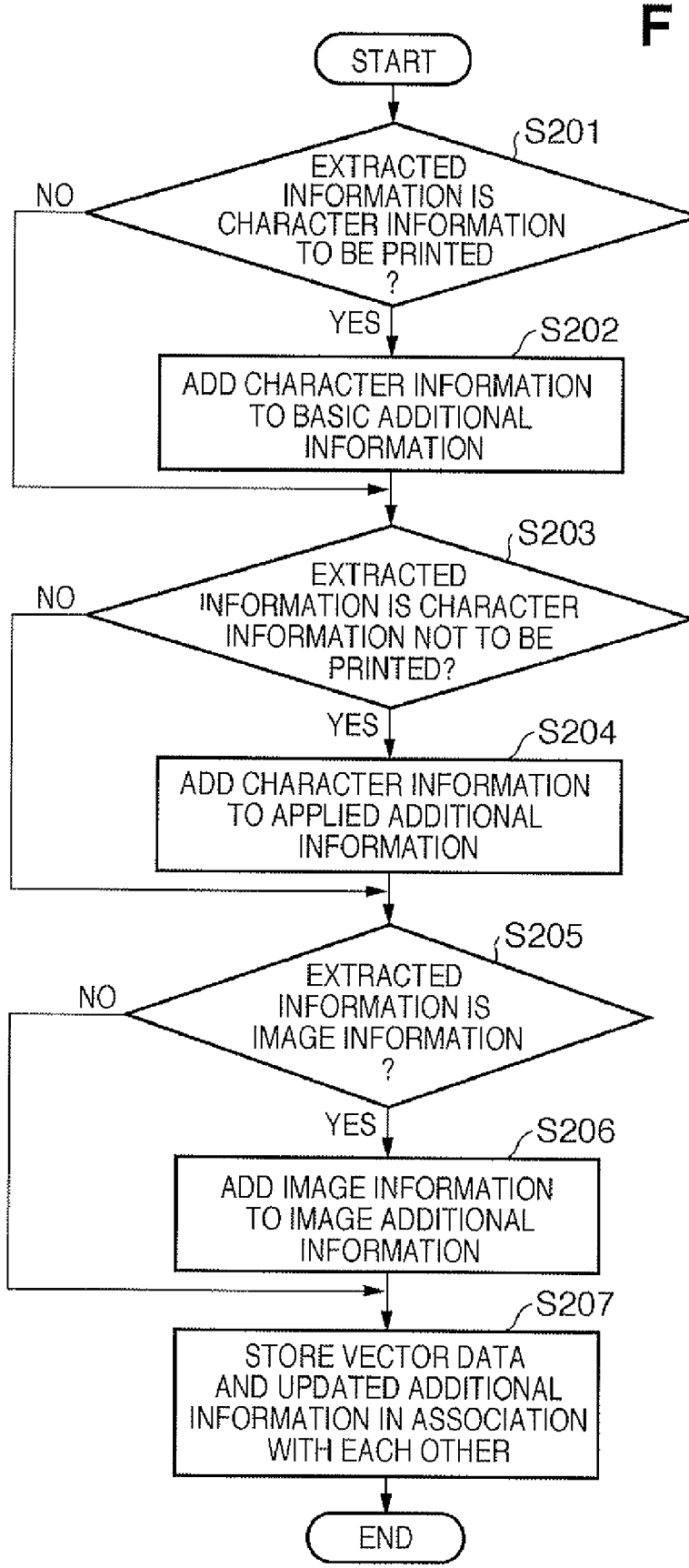
FIG. 9 is a flowchart illustrating additional information storage processing according to the second embodiment of the present invention.

Processing to be executed by a controller 200 of an MFP 100 according to the second embodiment will be described next with reference to FIG. 9. Note that FIG. 9 shows the same processing as in the flowcharts of FIGS. 7A and 7B of the first embodiment except the additional information storage method. A description of the same processing will not be repeated, and additional information storage processing in FIG. 9 will be described.

FIG. 9 is a flowchart illustrating additional information storage processing according to the second embodiment of the present invention.

In step S201, the controller 200 determines whether information extracted from input image data is character information to be actually printed. If the information is character information to be printed (YES in step S201), the process advances to step S202. If the information is not character information to be printed (NO in step S201), the process advances to step S203.

In step S202, the controller 200 adds the character information to basic additional information.

In step S203, the controller 200 determines whether information extracted from input image data is character information not to be actually printed. If the information is character information not to be printed (YES in step S203), the process advances to step S204. If the information is not character information not to be printed (NO in step S203), the process advances to step S205.

In step S204, the controller 200 adds the character information to applied additional information.

In step S205, the controller 200 determines whether information extracted from input image data is image information. If the information is image information (YES in step S205), the process advances to step S206. If the information is not image information (NO in step S205), the process advances to step S207.

In step S206, the controller 200 adds the image information to image additional information.

In step S207, the controller 200 associates the vector data with the various kinds of additional information (type-specific additional information including basic additional information, applied additional information, and image additional information), and stores them as a data file in a box allocated in a document storage unit 1030.

Search processing to be executed by the controller 200 for vector data and additional information stored in a box will be described next with reference to FIGS. 10A and 10B.

Figure 10B:
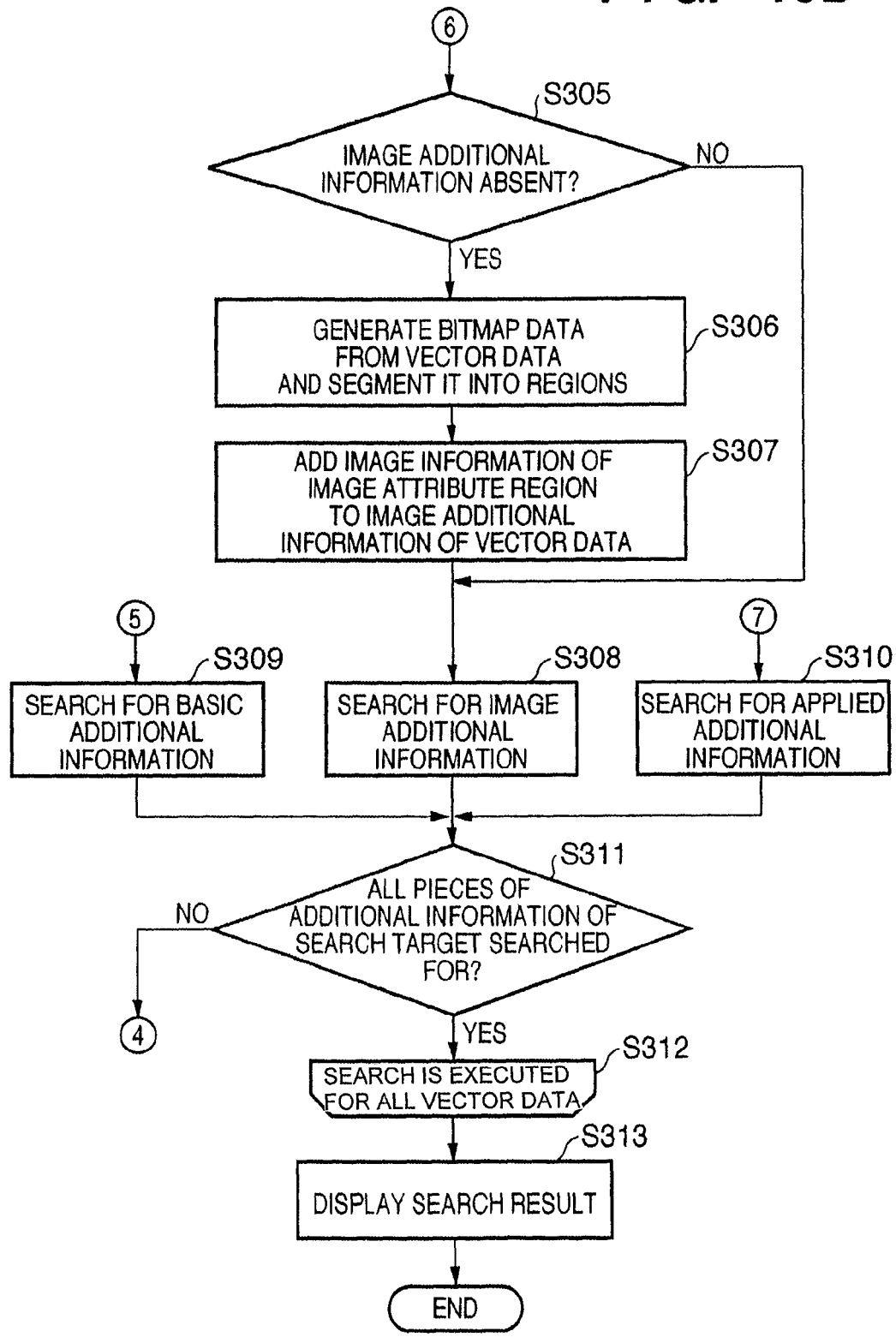

FIGS. 10A and 10B are flowcharts illustrating search processing according to the second embodiment of the present invention.

Note that the search processing is executed based on an instruction from, for example, a search operation panel.

An example of the search operation panel will be explained here with reference to FIG. 11.

FIG. 11 is a view showing an example of a search operation panel according to the second embodiment of the present invention.

An operation panel 91 includes an input window 92 to input a search keyword (search condition), and toggle switches 93 to 95 to select a search target from "basic information", "applied information", and "image information". The operation panel 91 also includes a window 97 which displays a search result (e.g., the file name of vector data associated with additional information) that satisfies the search condition, a status bar 96 indicating the progress of a search, and a slide bar 98 to slide the search result.

The operation panel 91 also includes an OK button 99a to give the instruction for execution of a search, and a cancel button 99b to give the instruction for cancellation of a search. When the user inputs and sets various conditions in the operation panel 91, and presses the OK button 99a, the search processing in FIGS. 10A and 10B are executed.

In step S301, the controller 200 determines whether a search keyword is input from the operation panel. If a search keyword is input (YES in step S301), the process advances to step S302. If no search keyword is input (NO in step S301), the process waits until it is input.

In step S302, the controller 200 determines additional information designated to the search target by the user.

The controller 200 executes the processes in steps S303 to S312 for all vector data in a box allocated in the document storage unit 1030.

In step S304, the process branches to the search target designated by the user.

When the search target is "basic additional information", the process advances to step S309. The controller 200 searches for basic additional information. When the search target is "applied additional information", the process advances to step S310. The controller 200 searches for applied additional information. When the search target is "image additional information", the process advances to step S305.

In step S305, the controller 200 determines whether there is no image additional information associated with vector data. If image additional information is absent (YES in step S305), the process advances to step S306. If image additional information exists (NO in step S305), the process advances to step S308.

In step S306, the controller 200 generates bitmap data from the vector data, and segments it into regions.

In step S307, as a result of region segmentation, the controller 200 calculates the image feature amount of each image attribute region, and adds it to the image additional information of the vector data as image information.

In step S308, the controller 200 searches for image additional information.

In step S311, the controller 200 determines whether all pieces of additional information of the search target designated by the user have been searched. If all pieces of additional information have been searched (YES in step S311), the process advances to step S312. If not all pieces of additional information have been searched (NO in step S311), that is, if unsearched additional information remains, the controller 200 searches for the remaining additional information.

When the controller 200 has ended the search for all vector data stored in the box in step S312, the process advances to step S313.

In step S313, the controller 200 displays the search result on the operation panel.

As described above, according to the second embodiment, pieces of additional information are classified into type-specific additional information and held in association with vector data. This implements more advanced search processing in addition to the effects described in the first embodiment.

In the first and second embodiments, information (invisible information) that is included in input image data and is not visible in print data converted from the input image data is especially used as search target information (usable for a search). However, the present invention is not limited to this. Information visible in print data may actively be used as search target information if it is effective for a search.

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or script data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-121646 filed on May 7, 2008, which is hereby incorporated by reference herein in its entirety.

What is claimed is:

1. An image processing apparatus for processing and holding input image data, comprising:
    a conversion unit adapted to convert the input image data into vector data;
    a determination unit adapted to determine a type of the input image data;
    an extraction unit adapted to
    1) if said determination unit has determined that the input image data is of a first data type, extract information usable for a search from the input image data in processing of converting the input image data into the vector data, and further extract information usable for a search from the vector data later in an idle time of the image processing apparatus,
    2) if said determination unit has determined that the input image data is of a second data type, extract information usable for a search by performing region segmentation of the input image data; and
    a holding unit adapted to hold, as additional information, the information extracted by said extraction unit in association with the vector data.

2. The apparatus according to claim 1, further comprising a rasterization unit adapted to rasterize the vector data into bitmap data,
    wherein said extraction unit comprises:
    a character information extraction unit adapted to extract character information included in PDL data;
    a character recognition unit adapted to recognize a text image included in the bitmap data and extract character information; and
    an image information extraction unit adapted to extract image information representing a feature of an image included in the bitmap data.

3. The apparatus according to claim 2, wherein if said determination unit has determined that the input image data is PDL data, said extraction unit
    causes said character information extraction unit to extract character information included in the PDL data in a process of causing said conversion unit to convert the PDL data into the vector data, and
    causes said image information extraction unit to extract image information representing a feature of an image included in the bitmap data, and
    if no character information is extracted by said character information extraction unit in the process, causes said character recognition unit to recognize a text image included in the bitmap data and extract character information.

4. The apparatus according to claim 3, wherein said holding unit holds the information extracted by said extraction unit in association with the vector data as type-specific additional information corresponding to a type of the information.

5. The apparatus according to claim 2, wherein if said determination unit has determined that the input image data is scan data that is bitmap data, said extraction unit causes said character recognition unit to recognize a text image included in the scan data that is the bitmap data and extract character information, and causes said image information extraction unit to extract image information representing a feature of an image included in the scan data that is the bitmap data.

6. The apparatus according to claim 1, further comprising:

an input unit adapted to input a search condition to search for the additional information;

a search unit adapted to search said holding unit for the additional information that satisfies the search condition input from said input unit; and a display unit adapted to display, as a search result, vector data associated with the additional information searched for by said search unit.

7. The apparatus according to claim 6, wherein said holding unit holds the information extracted by said extraction unit in association with the vector data as type-specific additional information corresponding to a type of the information, said input unit further designates a type of the additional information as the search condition, and said search unit searches said holding unit for the additional information of the designated type, which satisfies the search condition input from said input unit.

8. The apparatus according to claim 1, wherein the information usable for a search includes information that is included in the input image data and is not visible in the vector data.

9. A method of controlling an image processing apparatus for processing and holding input image data, comprising steps of:

converting the input image data into vector data;

determining a type of the input image data;

1) if it is determined in the determining step that the input image data is of a first data type, extracting information usable for a search from the input image data in processing of converting the input image data into the vector data, and further extracting information usable for a search from the vector data later in an idle time of the image processing apparatus, 2) if it is determined in the determining step that the input image data is of a second data type, extracting information usable for a search by performing region segmentation of the input image data; and holding, as additional information, the information extracted in the extracting step in association with the vector data.

10. A program stored in a non-transitory computer-readable storage medium to cause a computer to control an image processing apparatus for processing and holding input image data, causing the computer to execute steps of:

converting the input image data into vector data;

determining a type of the input image data;

1) if it is determined in the determining step that the input image data is of a first data type, extracting information usable for a search from the input image data in processing of converting the input image data into the vector data, and further extracting information usable for a search from the vector data later in an idle time of the image processing apparatus, 2) if it is determined in the determining step that the input image data is of a second data type, extracting information usable for a search by performing region segmentation of the input image data; and holding, as additional information, the information extracted in the extracting step in association with the vector data.

* * * * *